United States Patent [19]
Allen

[11] 3,770,241

[45] Nov. 6, 1973

[54] IMPACT CONTROL VALVE

[76] Inventor: Richard J. Allen, 32 Lane No. 8, Gaspee Point, Warwick, R.I. 02888

[22] Filed: June 15, 1971

[21] Appl. No.: 153,295

[52] U.S. Cl............... 251/76, 251/230, 137/624.13
[51] Int. Cl..................... F16k 31/10, F16k 31/524
[58] Field of Search..................... 251/76, 83, 230; 277/125; 137/624.11, 624.13

[56]  References Cited
UNITED STATES PATENTS

| | | | |
|---|---|---|---|
| 802,954 | 10/1905 | Waterman | 251/230 |
| 1,574,959 | 3/1926 | Dearing | 251/76 X |
| 2,041,416 | 5/1936 | Johnson | 251/76 |
| 3,344,809 | 10/1967 | Smith | 251/230 X |

Primary Examiner—Martin P. Schwadron
Assistant Examiner—David R. Matthews
Attorney—Wolf et al.

[57] ABSTRACT

A fluid flow control valve is operated to close and at least partially open an aperture defined in a wall dividing the casing of the valve. A closure member covers the aperture thereby preventing a fluid communication through the wall when the valve is in a closed position, and may be rotated to either a fully or partially opened position to allow fluid communication. A means is provided for causing rotation of the closure member and includes motion transfer means for coupling an externally applied force to the closure member. An impacting member is mounted outside the casing for applying the external force by striking against an outer portion of the casing, and the means for causing rotation may include a one way clutch responsive to the striking for rotating the closure member through a predetermined angle.

16 Claims, 9 Drawing Figures

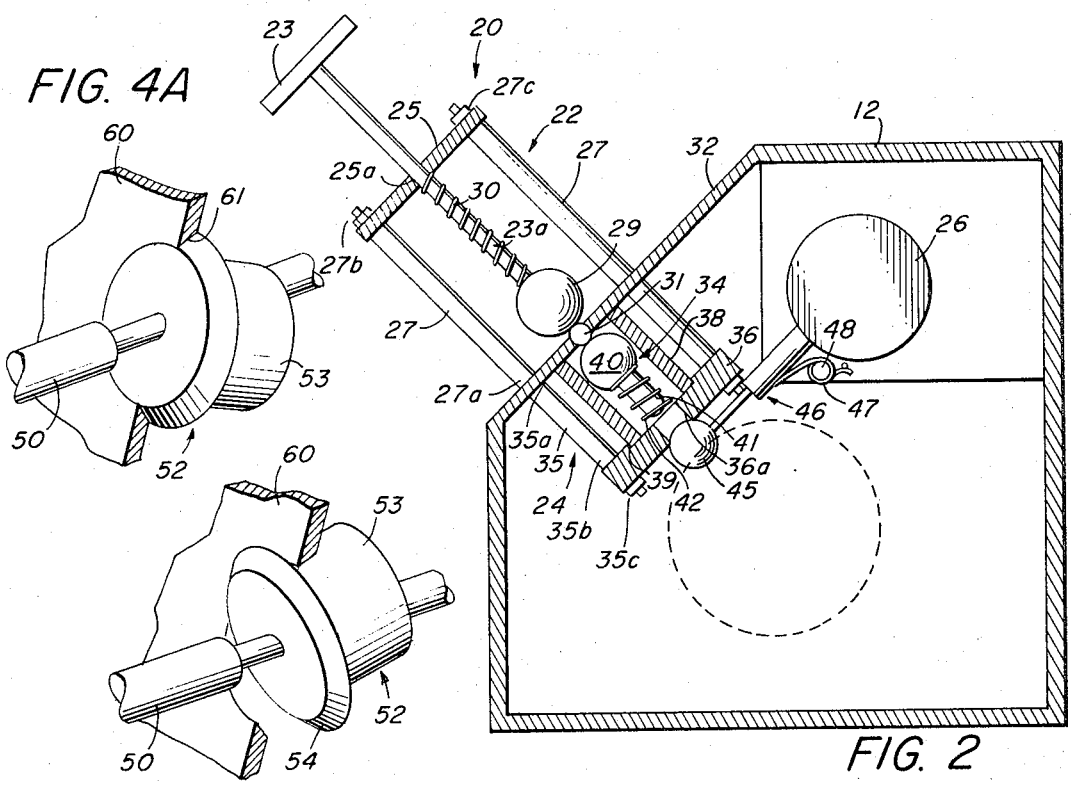
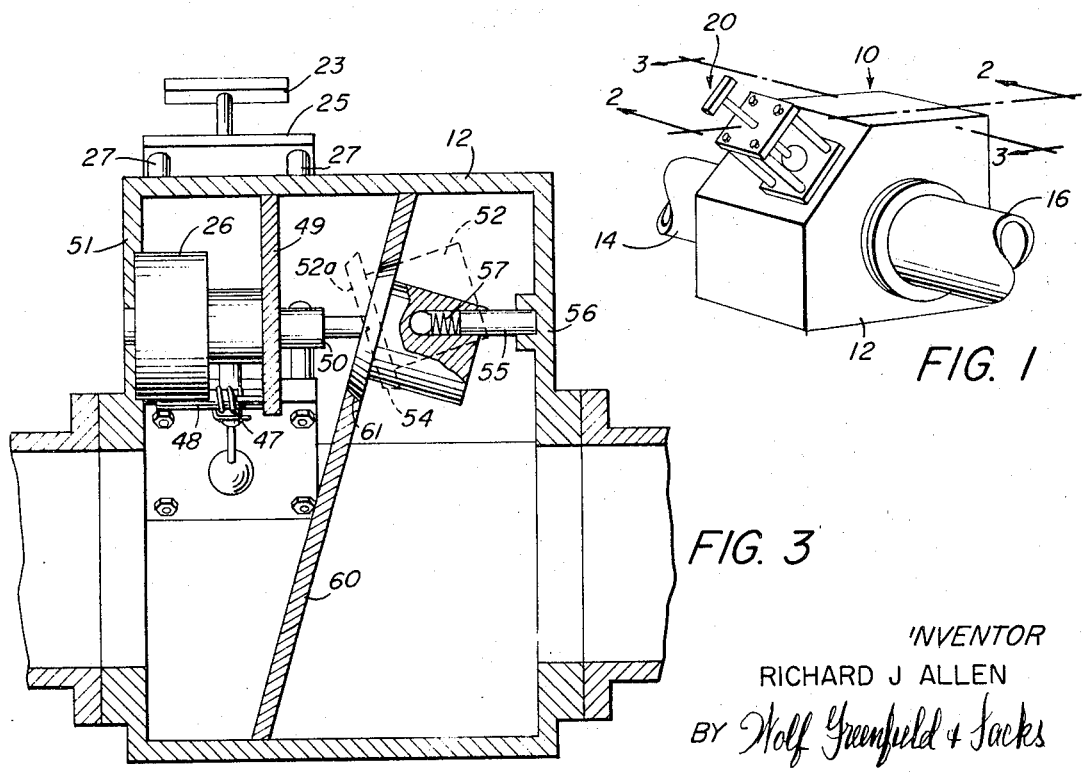

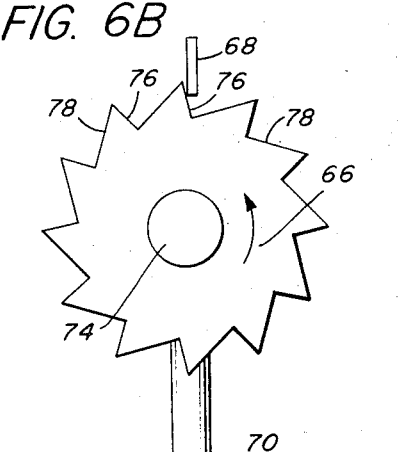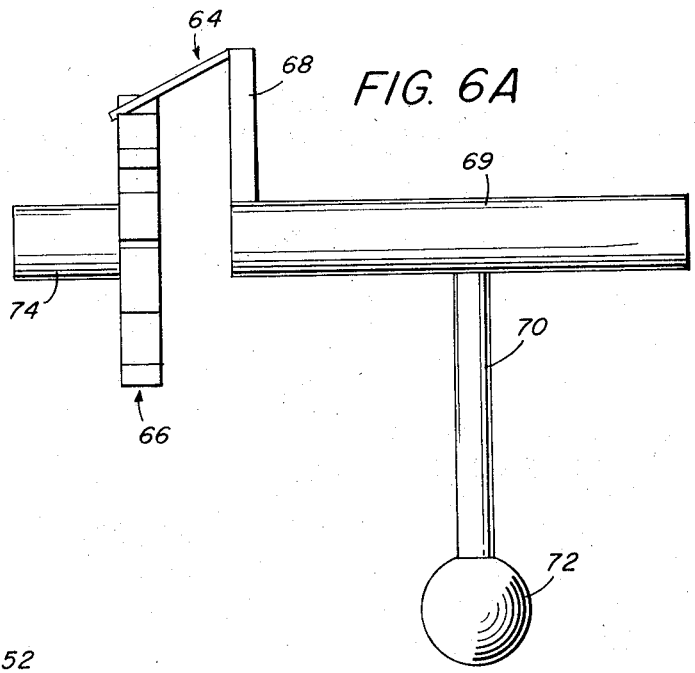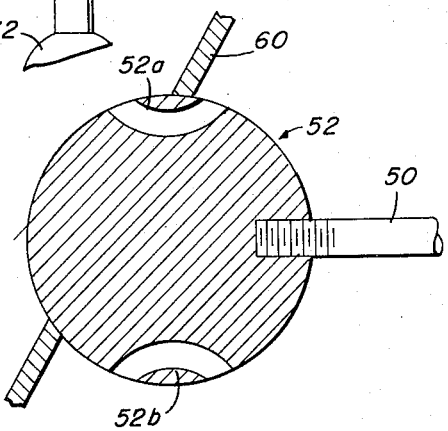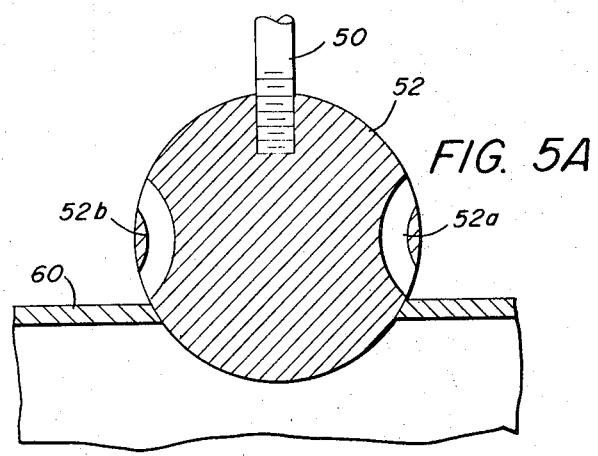

IMPACT CONTROL VALVE

FIELD OF THE INVENTION

The present invention relates generally to the field of fluid flow control valves and is more particularly directed to such a valve that employs an external impacting control member for opening and closing the valve wherein no sealing means need be provided between the control member and the casing of the valve as is conventional in present fluid flow control valves.

BACKGROUND OF THE INVENTION

There presently exists various types of fluid flow control valves including such valves as frusto-conic top entry valves and rotatable ball valves. All of these known valves generally include a housing, a closure member such as a sphere having a passage therethrough, and a control member externally accessible but coupled to the closure member. A packing or sealing means is needed between the control member and the casing to prevent fluid from leaking from the housing. Periodically the packing has to be checked and possibly replaced. This has been a longstanding problem in the valve art, and is particularly important when the fluid that is being controlled is either volatile or explosive. One such prior art valve showing packing means between a control member and the casing of the valve is shown in U.S. Pat. No. 3,284,089 of Wrenshall issued Nov. 8, 1966.

OBJECTS OF THE INVENTION

Accordingly, it is a primary object of the present invention to provide a fluid flow control valve that overcomes the aforementioned prior art problem by employing an impacting control means that operates the closure member of the valve by transmitting energy through the valve casing.

Another object of the present invention is to provide a fluid flow control valve in accordance with the primary object that has no need for sealing or packing means between the casing and control means.

A further object of the present invention is to provide a fluid flow control valve in accordance with the primary object wherein a hammer arrangement is employed to strike an outer surface of the valve casing transferring such motion to a responsive motion transfer member inside the casing that causes opening or closing of the closure member.

Still a further object of the present invention is to provide a valve connectable to separate conduit sections that has an enclosing casing that may be integrally formed and preferably has no passages therein other than for connection to the conduit sections.

SUMMARY OF THE INVENTION

To accomplish the foregoing and other objects the valve of the present invention includes an enclosed casing having means for communicating with separate conduit sections. In a typical application two conduit sections are provided and are coupled by conventional coupling means to opposite outer walls of the casing, having conduit accommodating passages therein. A wall is disposed within the casing, is preferably tilted from the vertical, and divides the casing into first and second chambers. The wall has an opening defined therein that is preferably circularly shaped and has an annular beveled surface associated therewith. A closure member having a maximum diameter larger than the diameter of the aperture covers the opening in the wall when the valve is in a closed position and rotatable means are provided inside the casing responsive to an externally applied force for causing rotation of the closure member in relation to the opening to cause an opening and closing of the valve. Impacting means are disposed external of the casing for forcibly contacting an outer surface of the casing thereby transferring energy through the casing to impart rotation to the rotatable means.

BRIEF DESCRIPTION OF THE DRAWINGS

Numerous other features and objects of the invention should now become apparent from a reading of the following detailed description in conjunction with the accompanying drawings in which:

FIG. 1 is a perspective view of a valve constructed in accordance with the principles of the present invention;

FIG. 2 is a cross-sectional view taken along the line 2—2 of FIG. 1 and showing the control means of FIG. 1 in more detail;

FIG. 3 is a cross-sectional view taken along the line 3—3 of FIG. 1 and showing the closure member in closed and open positions;

FIGS. 4A and 4B show a fragmentary perspective view including the closure member of FIG. 3 in a closed and partially open position, respectively;

FIGS. 5A and 5B show fragmentary cross-sectional top and side views of an alternate embodiment of a closure member in a closed and open position, respectively; and FIGS. 6A and 6B show front and side views, respectively, of a ratchet and pawl arrangement that may be used in lieu of the one way clutch means.

DETAILED DESCRIPTION OF THE DRAWINGS

Referring now to the drawings and in particular to the perspective view of FIG. 1 there is shown a valve generally illustrated at 10 which includes a casing 12 having separate conduit sections 14 and 16 extending from opposite walls thereof. A control means 20 is operable by pulling on the handle to cause a closure member (not shown in FIG. 1) to open and close in response thereto.

The cross-sectional view of FIG. 2 taken along line 2—2 of FIG. 1 shows the control means 20 which includes an external impacting member 22 and a motion transfer member 24. The member 24 transfers motion to a rotatable one way clutch means 26 when the impacting member 22 is manually actuated.

The impacting member 22 generally includes a handle 23, a supporting plate 25, and four spacing posts 27. The lower end 23a of handle 23 has a spherical mass 29 secured thereto, and has a helical spring 30 extending thereabout between the bottom surface of plate 25 and mass 29. The plate 25 has an aperture 25a centrally disposed therein that is slightly larger in diameter than the handle 23 thereby enabling movement of the handle in an upward direction to in turn cause mass 29 to move away from the dimple 31 extending from the surface of inclined wall 32 of casing 12. When the handle 23 is released the mass 29 is forcibly urged by spring 30 which is then compressed toward dimple 31 thereby transferring the force from the impacting member 22 through wall 32 to the motion transfer member 24 located internal of casing 12.

The plate 25 of member 22 is used to support the handle 23 and has four supporting posts 27 equally disposed at the four corners of plate 25. Each post 27 is affixed at its lower end 27a by suitable means such as by being welded to the outer surface of wall 32. The upper end 27b of each post 27 is threaded and accommodates a nut 27c for securing the plate 25 against the top of the posts 27. It should be apparent that other means may be used for causing an impacting motion against the surface of wall 32 at dimple 31. Also, it is possible that the dimple 31 may be eliminated and that the surface may be completely flat in the impacting area.

The motion transfer member 24 absorbs the motion imparted by mass 29 and transfers this motion to one way clutch means 26 to cause closure member rotation. The member 24 generally includes a mass member 34, four supporting posts 35, and a supporting plate 36. The mass member 34 is disposed in a cylindrical chamber defined by cylindrical wall 38 which extends from wall 32 to a recess 39 in plate 36. The member 34 includes a spherical top portion 40 and an extending post portion 41. A helical spring 42 is disposed about portion 41 between plate 36 and spherical end 40 and is adapted to bias the member 34 upwardly against the inner surface of wall 32.

The posts 35 (only two posts are shown in FIG. 2) have an upper end 35a which may be fixed to the inner surface of wall 32 by welding or other suitable means. The other end 35b of each post 35 has a threaded end for accommodating a nut 35c which may be tightened to hold the cylindrical wall 38 tightly in place between wall 32 and plate 36.

The plate 36 has an aperture 36a centrally disposed therein and dimensioned to accommodate portion 41 of member 34. The post portion 41 extends slightly into aperture 36a in a normal position and is forced by impacting member 22 toward pivotal ball 45 of one way clutch means 26.

The clutch means 26 may be of conventional design and includes a radially extending arm 46 having the ball 45 attached at its end. A spring means 47 is attached about a support post 48 (see FIG. 3) and is adapted to bias arm 46 toward plate 36. The post 48 may be suitably supported from a wall 49 in the casing 12 as depicted in FIG. 3. FIG. 3 also indicates that the clutch means 26 is suitably positioned between wall 49 and outer wall 51, and its output shaft 50 is caused to rotate in response to movement of spherical ball 45 when the impacting member 22 is operated which in turn causes movement of mass member 34 through aperture 36a.

Referring now to FIGS. 3, 4A and 4B the operation of the closure member 52 is discussed in detail. The closure member 52 includes a cylindrical portion 53 and a bevelled end portion 54. Apertures are disposed in both portions of closure member 52, one for accommodating the end of shaft 50 and the other for accommodating a fixed post 55 extending from a wall 56 of casing 12. A spring 57 may be disposed within the aperture in portion 53 and is adapted to bias the closure member 52 towards its seating wall 60 in casing 12. Wall 60 has a bevelled aperture 61 therein for accommodating the closure member 52 when in a closed position as indicated in solid line in FIG. 3 and in FIG. 4A.

In FIG. 3, it is noted that wall 60 is tilted at about a 20° angle and that the post 55 and shaft 50 support member 52 in an eccentric manner. Shaft 50 enters member 52 at an angle to the surface 52a thereof, and post 55 enters member 52 at an outer edge of portion 53. The shaft 50 and post 55 are in line and when shaft 50 is rotated from the position of FIG. 4A to the position of FIG. 4B, the valve is partially open because bevelled portion 54 is no longer completely sealed against bevelled aperture 61.

In the operation of the valve of this invention when the impacting member 22 is actuated by withdrawing handle 23, the motion is transferred by means of member 34 to the sphere 45 of clutch means 26. The clutch means 26 rotates through a predetermined angle as may be determined by a stop means (not shown). This stop means may be provided in the general vicinity of the spring 47. The output shaft 50 of clutch means 26 rotate through a predetermined angle thereby causing member 52 which is fixed to output shaft 50 to rotate from a closed position, for example, to a position as shown in dotted outline in FIG. 3 and as also shown in FIG. 4B. Spring 47 causes means 26 to return to the position shown in FIG. 2 but shaft 50 does not rotate back and member 52 remains in its rotated-to position. The closure member 52 is of course free to rotate on post 55. This operation thus causes a partial opening of the valve by rotation of closure member 52. Subsequent actuations of impacting member 22 cause the closure member 50 to rotate further to a fully open position and thereafter to a closed position. The shaft 50 rotates through 360° in order to go from a closed position to an open position and back again to a closed position.

Referring now to FIGS. 5A and 5B there is shown an alternate embodiment of the closure member 52 in a closed and open position, respectively. The closure member 52 is spherically shaped and includes oppositely disposed passages 52a and 52b. The output shaft 50 of one way clutch means 26 has a threaded end for attachment of the closure member 52 thereto. In FIG. 5A member 52 is positioned so that the passages 52a and 52b are both on one side of wall 60 and thus the valve is in a closed position. However, in FIG. 5B the shaft 50 has been rotated through a predetermined angle wherein one of the passages 52a communicates between opposite sides of wall 60 thereby causing an opening of the valve.

In the embodiment of FIGS. 5A and 5B the shaft 50 extends toward the center of sphere 52 and the passages 52a and 52b may be located, as shown, or be closer or farther from shaft 50. The passages may also be formed in many different sizes and shapes. With the embodiment shown in FIGS. 5A and 5B the valve may be kept in a closed position for a longer period than the open position during shaft rotation. Alternatively, with the embodiment of FIGS. 4A and 4B the valve is closed in only one position and is fully or partially open in other positions.

FIGS. 6A and 6B show an alternate embodiment that may replace the one way clutch means of FIGS. 2 and 3. This embodiment comprises a ratchet 64 and pawl 66 arrangement which may be of conventional design. The ratchet 64 includes an arm 68 extending radially from an elongated support member 69 which may be suitably supported in the casing of the valve and free to rotate therein. An actuable arm 70 is fixed at one end to member 69 near its midpoint and has a mass member 72 secured to its opposite end. Mass member 72 is analagous to member 45 shown in FIG. 2 and has motion imparted thereto when the impacting member is manually operated. This motion causes member 69 to rotate which in turn causes arm 68 to rotate pawl 66 in a counterclockwise direction as viewed in FIG. 6B.

The pawl 66 is suitably supported for rotation on shaft 74 which may be secured to a wall of the valve casing. The pawl shown in FIG. 6B has twelve teeth with each tooth having a steeply-inclined surface 76 against which arm 68 is urged when the valve is actuated. The counter-clockwise movement of the arm 68 (see FIG. 6B) causes the arm to rotate the pawl counter-clockwise until the arm has passed over surface 76. Spring means (not shown) are then used to return the arm 68 to its initial starting position as defined by a stop means (not shown) for example. When the arm 68 returns (clockwise) it slips over the other, more gradually sloped surface 78 of the tooth without causing the pawl to move clockwise. Thus, for each actuation of mass 72 by a member like member 34 of FIG. 2, the pawl rotates one-twelfth of a revolution. With the closure member secured to shaft 74 in a manner similar to that previously discussed with reference to shaft 50 in FIG. 3, the closure member also rotates from a closed position, for example, through one-twelfth a revolution to a partially open position. Additional actuations cause fuller opening of the valve and thereafter a closing of the valve after twelve such actuations.

Another interesting feature of the present invention is realized in the closure member embodiment of FIGS. 4A and 4B. By providing an eccentrically arranged closure member and mating wall, the closure member sweeps circularly about bevelled aperture 61 as it is rotated, thus causing a cleaning action between the closure member and wall. This tends to keep the closure member and wall in sealed contact when the closure member is in its closed position.

The embodiments disclosed herein are now contemplated as the best for practicing the principles of the present invention. However, it should be apparent to those skilled in the art that other embodiments and modifications thereof may be constructed, all of which fall within the spirit and scope of the present invention. For example, in the disclosed embodiments a number of manual actuations are needed in order to rotate the closure member through one revolution. In other embodiments different closure members may be employed having different shapes or different passages therein that would enable open and closing to occur with a single manual actuation. Also, additional apparatus could be employed with the apparatus of the present invention so that it could be operated automatically. All departures from and modifications of the embodiment disclosed herein of the present invention should, therefore, only be limited by the appended claims.

What is claimed is:
1. A valve comprising;
   a casing having a fluid inlet port and a fluid outlet port,
   a rotatable closure member disposed within said casing having an open position for permitting fluid flow between said inlet and outlet ports and a closed position for preventing said fluid flow,
   means disposed external of said casing for controlling the opening and closing of said closure member,
   means for supporting saied controlling means adjacent to an outer surface of a wall of said casing,
   said external controlling means including impacting means for applying a blow at a predetermined area of said outer surface,
   and means disposed internal of said casing and positioned to respond to said applied force for causing rotation of said closure member including means disposed at an inner surface of said wall opposite said predetermined area inertially responsive to said applied blow.

2. A valve as defined in claim 1 wherein said means for causing rotation includes a clutch means having an actuable arm for responding to said applied force and an output shaft coupled to said closure member for causing opening and closing thereof.

3. A valve as defined in claim 1 wherein said means for causing rotation includes a rachet and pawl arrangement with the pawl portion located to respond to said applied force and with the rachet portion having an output shaft coupled to said closure member for causing opening and closing thereof.

4. A valve as defined in claim 1 wherein said casing includes an inside wall having a circular aperture therethrough, and said closure member has a circular surface that mates with the circular aperture when the closure member is in the closed position.

5. A valve as defined in claim 4 wherein said means for causing rotation includes an output shaft that fits within a hole in the closure member wherein said shaft and inside wall are non-perpendicular to each other so that rotation of said shaft having said closure member secured thereto causes communication between opposite sides of said wall.

6. A valve as defined in claim 5 having a post extending from an outer wall of said casing extending into another hole in said closure member for suitably supporting said closure member for rotation relative to said post.

7. A valve as defined in claim 1 wherein said casing includes an inside wall defining separate sections of the casing having an aperture therethrough, and said closure member is substantially spherical having at least one passage extending therethrough.

8. A valve as defined in claim 7 wherein said means for causing rotation includes an output shaft that fits within a hole in the closure member wherein said shaft and wall are non-perpendicular to each other, and wherein said at least one passage is disposed so that both ends thereof terminate on the same side of said wall when the closure member is in a closed position and terminate on opposite sides of the wall when the closure member is in an open position.

9. A valve as defined in claim 8 wherein said closure member has at least two passages therethrough that have arcuate cross-sections and are disposed in opposite surfaces of said spherical closure member.

10. A valve as defined in claim 1 wherein said impacting means includes a hammer arrangement supported from an outer surface of said casing.

11. A valve as defined in claim 10 wherein said hammer arrangement includes an actuating handle, mass member and spring means for biasing the mass member toward the predetermined area of the outer surface when the handle is in its non-actuated position.

12. A valve as defined in claim 11 wherein said means for causing rotation includes motion transfer means having a mass member and spring means for biasing the mass member toward the inner surface of the casing opposite the mass member of the hammer arrangement.

13. A valve comprising a casing, a control means and a closure member coupled to the control means and responsive thereto, said control means having means external and internal of said casing for controlling opening and closing of said closure member, said casing having a wall dividing the casing into at least two chambers and having an aperture therethrough, said closure member and an output of said control means comprising an arrangement permitting said closure member to cover said aperture when said closure member is in a closed position and to at least partially open the aperture when said closure member is in an open position, said output of said control means and said dividing wall being non-perpendicular to each other to facilitate said opening and closing.

14. The valve of claim 13 wherein said closure member is cylindrically shaped having a beveled flange mating with said aperture when in a closed position.

15. The valve of claim 14 wherein said closure member is supported eccentrically.

16. The valve of claim 15 wherein said closure member is substantially spherical having at least one passage extending therethrough.

* * * * *